United States Patent [19]

Saito et al.

[11] Patent Number: 4,814,618

[45] Date of Patent: Mar. 21, 1989

[54] RADIATION IMAGE READ-OUT METHOD AND RADIATION IMAGE RECORDING READ-OUT APPARATUS

[75] Inventors: Tokukazu Saito; Masamitsu Ishida, both of Kanagawa, Japan

[73] Assignee: Fuji Photo Film Co., Ltd., Kanagawa, Japan

[21] Appl. No.: 712,063

[22] Filed: Mar. 15, 1985

[30] Foreign Application Priority Data

Mar. 16, 1984 [JP] Japan .................................. 59-50488
Mar. 16, 1984 [JP] Japan .................................. 59-50489

[51] Int. Cl.$^4$ ............................................. G01T 1/105
[52] U.S. Cl. .................................. 250/327.2; 250/484.1
[58] Field of Search ........................ 250/484.1, 327.2; 364/414; 358/284

[56] References Cited

U.S. PATENT DOCUMENTS 4,284,889  8/1981  Kato et al. ..................... 250/327.2
4,527,060  7/1985  Lazuki et al. .................. 250/327.2
4,543,479  9/1985  Kato .............................. 250/327.2

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image read-out method comprises the steps of detecting the amount of light instantaneously emitted by a specific region of a stimulable phosphor sheet when the stimulable phosphor sheet is exposed to a radiation passing through an object to have a radiation image of the object stored therein, and adjusting read-out conditions and/or image processing conditions on the basis of the detected light amount. The stimulable phosphor sheets are circulated through an image recording section, a read-out section, and an erasing section by conveyor belts and reused for image recording.

9 Claims, 6 Drawing Sheets

RADIATION IMAGE READ-OUT METHOD AND RADIATION IMAGE RECORDING READ-OUT APPARATUS

BACKGROUND OF THE INVENTION

1. Field of the Invention

This invention relates to a radiation image readout method for use in a radiation image recording and reproducing system, and a radiation image recording and read-out apparatus for carrying out the method. This invention particularly relates to a method of adjusting read-out conditions and/or image processing conditions for use in a radiation image recording and reproducing system, and a radiation image recording and read-out apparatus for carrying out the method, in which a stimulable phosphor sheet is circulated and reused for recording radiation images.

2. Description of the Prior Art

When certain kinds of phosphors are exposed to a radiation such as X-rays, α-rays, β-rays, γ-rays, cathode rays or ultra-violet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load a mobile X-ray diagnostic station with a number of stimulable phosphor sheets, and the amount of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining in the stimulable phosphor sheet after it is scanned with stimulating rays to read out the radiation image stored therein should be eliminated or erased by the method as described, for example, in Japanese Unexamined Patent Publication No. 56(1981)-12599 or U.S. Pat. No. 4,400,619. The stimulable phosphor sheet should then be used again for radiation image recording.

Accordingly, it is desired that there be combined into a single apparatus: an image recording section for exposing each circulatable and reusable sheet composed of a stimulable phosphor to a radiation passing through an object, an image read-out section for reading out the radiation image stored in the stimulable phosphor sheet, and an erasing section for erasing the radiation energy remaining in the stimulable phosphor sheet after the readout step for the purpose of again recording another radiation image therein. This is because such an arrangement would make it possible to easily load the apparatus on the mobile X-ray diagnostic station to conduct medical examinations at different locations. Such an apparatus could also be easily installed in a hospital r the like. This is very advantageous in practical use.

The radiation image recording and read-out apparatus using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the stimulable phosphor varies over a very wide range in proportion to the amount of energy stored therein, it is possible to obtain an image having desirable density regardless of the amount of exposure of the stimulable phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

Also, in the radiation image recording and read-out apparatus using a stimulable phosphor sheet, compensation for deviation of the level of the radiation energy stored in the stimulable phosphor sheet from a desired level can easily be carried out by adjusting the read-out gain to an appropriate value when photoelectrically reading out the light emitted from the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low.

However, in order to eliminate various influences caused by the fluctuation of radiographic exposure conditions and/or to obtain a radiation image having a high image quality or a high diagnostic efficiency and accuracy, it is necessary to investigate such image input conditions of the radiation image stored in the stimulable phosphor sheet as, for example, the level of radiation dose used for image recording, or the image input pattern which is determined by the portion of the body (e.g. the chest or the abdomen) or the image recording method used, such as plain image recording or contrasted image recording, before conducting final read-out for obtaining radiation image information for reproducing the radiation image to a visible image, and then to adjust the read-out conditions such as the read-out gain to appropriate values or to process the electric signal appropriately on the basis of the detected radiation image information. It is also necessary to determine the scale factor to optimize the resolution according to the contrast of the image input pattern.

Grasping of the radiation image information prior to the final read-out and adjustment of the read-out conditions on the basis of the grasped information may be conducted by use of the method as disclosed in U.S. Pat. No. 4,284,889, which is based on the finding that the amount of light instantaneously emitted by the stimulable phosphor sheet upon exposure thereof to a radiation is proportional to the amount of the radiation energy stored in the stimulable phosphor sheet. In this method, the amount of light instantaneously emitted by the whole surface of the stimulable phosphor sheet is detected by use of many photodetectors, and the read-out conditions are adjusted on the basis of the maximum and the minimum of the instantaneous light emission amount.

However, in the aforesaid method, since many photodetectors are used for detecting the amount of light instantaneously emitted by the whole surface of the stimulable phosphor sheet, the configuration of the apparatus for carrying out the method becomes complicated. Further, it is not always possible to correct the sensitivity of each photodetector and to control photodetectors so that all the photodetectors exhibit the same sensitivity.

In the aforesaid radiation image recording and read-out apparatus, in order to obtain an image having an improved image quality, particularly a high diagnostic efficiency and accuracy, it is desirable to approximately grasp in advance the radiation image information stored in the stimulable phosphor sheet, and to photoelectrically detect the light emitted by the stimulable phosphor sheet for obtaining an image signal by use of read-out conditions adjusted on the basis of the grasped image information, or to process the image signal by use of image processing conditions adjusted on the basis of the grasped image information. When the radiation image recording and read-out apparatus is fabricated for conveying in the aforesaid mobile X-ray diagnostic station, the apparatus should be simplified as much as possible. However, the method of approximately grasping in advance the radiation image information by detecting the light instantaneously emitted by the whole surface of the stimulable phosphor sheet by use of many photodetectors is not suitable for this purpose since the apparatus becomes complicated, the cost becomes high and it is not always possible to control photodetectors so that all of the photodetectors exhibit the same sensitivity. Thus a need exists for a method of more simply grasping the image information.

SUMMARY OF THE INVENTION

The primary object of the present invention is to provide a radiation image read-out method which very simply adjusts the read-out conditions and/or image processing conditions on the basis of light instantaneously emitted by the stimulable phosphor sheet when the sheet is exposed to a radiation.

Another object of the present invention is to provide a radiation image read-out method which simplifies the configuration of the radiation image recording and read-out apparatus and decreases the cost.

The specific object of the present invention is to provide a radiation image recording and read-out apparatus for carrying out the method which is small in size and suitable for conveying, and in which stimulable phosphor sheets for recording radiation images are circulated and reused and image recording is conducted at high speeds.

The radiation image read-out method in accordance with the present invention is characterized by detecting the amount of light instantaneously emitted by a specific region of a stimulable phosphor sheet when the stimulable phosphor sheet is exposed to a radiation passing through an object to have a radiation image of the object stored therein, and adjusting read-out conditions and/or image processing conditions on the basis of the detected light amount.

The radiation image recording and read-out apparatus in accordance with the present invention comprises:

(i) a circulating and conveying means for conveying at least one stimulable phosphor sheet for recording a radiation image therein along a predetermined circulation path, (ii) an image recording section positioned on said circulation path for recording a radiation image of an object in said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned with said stimulating rays to obtain an electric image signal, (iv) an erasing section for, prior to the next image recording in said stimulable phosphor sheet for which the image read-out has been conducted at said image read-out section, exposing said stimulable phosphor sheet to erasing light to release the radiation energy remaining in said stimulable phosphor sheet, (v) a light amount detecting means for detecting the amount of light instantaneously emitted by a specific region of said stimulable phosphor sheet when said stimulable phosphor sheet is exposed to the radiation passing through said object to have said radiation image of said object stored therein at said image recording section, and (vi) a condition adjusting means for adjusting read-out conditions used for detecting the light emitted by said stimulable phosphor sheet to obtain the electric image signal at said image read-out section and/or image processing conditions used for image processing of the electric image signal obtained at said image read-out section on the basis of the instantaneous light emission amount detected by said light amount detecting means.

In the present invention, the electric image signal obtained in the image read-out section may be once stored in a recording medium such as a magnetic tape or a magnetic disk, displayed on a CRT or the like to immediately observe the radiation image, or permanently recorded as a hard copy on a photographic material or the like by use of a reproducing apparatus. The reproducing apparatus may be directly coupled with the radiation image recording and read-out apparatus in accordance with the present invention, or installed separately from the radiation image recording and read-out apparatus for conducting reproduction via a memory, or placed at a remote position for carrying out reproduction through radio communication. In the last mentioned case, it is possible, for example, to reproduce the radiation image recorded in the mobile X-ray diagnostic station by use of a radio signal receiver in a hospital, and through radio communication to inform the mobile X-ray diagnostic station of the results of diagnosis conducted by a radiologist at the hospital.

The "stimulable phosphor" referred to in this invention means a phosphor which is able to store radiation energy therein upon exposure to a radiation such as X-rays, $\alpha$-rays, $\beta$-rays, $\gamma$-rays, cathode rays or ultraviolet rays, and then emit light in proportion to the stored energy of the radiation upon stimulation with stimulating rays such as visible light.

By "stimulable phosphor sheet" is meant a sheet-like recording material comprising the aforesaid stimulable phosphor. In general, the stimulable phosphor sheet is composed of a substrate and a stimulable phosphor layer overlaid on the substrate. The stimulable phosphor layer comprises an appropriate binder and the stimulable phosphor dispersed therein When the stimulable phosphor layer is self-supporting, the stimulable phosphor layer can by itself form the stimulable phosphor sheet.

In the present invention, in order to improve the signal-to-noise ratio, it is preferable that the stimulable phosphor emit light having a wavelength range not overlapping upon the range of wavelength of the stimulating rays employed to excite the stimulable phosphor. Preferably, when a laser source which emits stimulating rays having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

As the stimulable phosphor, for example, rare earth activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0<x+y\leq 0.6$ and $xy\neq 0$, and a is a number satisfying $10^{-6}\leq a\leq 5\times 10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leq x\leq 0.6$, and y is a number satisfying $0\leq y\leq 0.2$. Further, as the stimulable phosphor to be used in this invention can be used ZnS:Cu,Pb; $BaO.xAl_2O_3$:Eu wherein $0.8\leq x\leq 10$; and $M^{II}O.xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5\leq x\leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light upon stimulation of the phosphor.

Further, barium fluorohalide phosphors added with a metal fluoride as disclosed in European Patent Publication No. 21,342, or barium fluorohalide phosphors added with at least one of a metal chloride, a metal bromide and a metal iodide as disclosed in European Patent Publication No. 29,963 are also preferable because of their improved light emitting characteristics upon stimulation of the phosphor.

It is also desirable to color the phosphor layer of the stimulable phosphor sheet made of the above phosphor by use of pigments or dyes to improve the sharpness of the image obtained thereby as disclosed in U.S. Pat. No. 4,346,295.

The detection of the amount of light instantaneously emitted by the specific region of the stimulable phosphor sheet may be conducted, for example, by use of a filter effecting that the portion corresponding to the specific region transmits the radiation an the instantaneously emitted light and the other portions transmit the radiation and absorb the instantaneously emitted light.

The specific region of the stimulable phosphor sheet may be an arbitrarily selected region and may, for example, be the center region of the sheet. The specific region need not necessarily be a single portion of the stimulable phosphor sheet and may consist of a plurality of portions. The specific region may be selected in accordance with the image recording portion and/or image recording method.

By the term "read-out conditions" as used herein are meant various conditions affecting the relationship between the amount of light emitted by the stimulable phosphor sheet when it is exposed to stimulating rays and the output of the read-out apparatus, for example, the read-out gain determining the relationship between the input and the output of the read-out apparatus, the scale factor, or the power of stimulating rays used for image read-out.

By "image processing conditions" are meant various conditions affecting the relationship between the input and the output of the electric image signal at the image processing step, for example, gradation processing conditions.

In the present invention, any method may be used for adjusting the read-out conditions and/or image processing conditions on the basis of the amount of light instantaneously emitted by the specific region of the stimulable phosphor sheet.

In the present invention, since the radiation image information stored in the stimulable phosphor sheet is approximately grasped in advance and the read-out conditions and/or image processing conditions are adjusted on the basis of the grasped image information, it is possible to obtain a reproduced visible image having an improved image quality, particularly a high diagnostic efficiency and accuracy.

Further, since the approximate grasping of the radiation image information is conducted by detecting the amount of light instantaneously emitted by the specific region of the stimulable phosphor sheet, the present invention has the advantage over the method wherein the amount of light instantaneously emitted by the whole surface of the stimulable phosphor sheet by use of many photodetectors and the read-out conditions and/or image processing conditions are adjusted by processing a large amount of signals in that it is possible to very easily adjust the read-out conditions and/or image processing conditions, to simplify the configuration of the apparatus and to decrease the cost.

This is because, in the present invention, it is sufficient that a single photodetector or at most five photodetectors be used for detecting the amount of light instantaneously emitted by the specific region of the stimulable phosphor sheet. Therefore, it is possible to simplify the configuration of the apparatus and to reduce the cost. Also, correction of sensitivity of the photodetector becomes unnecessary or very easy to conduct.

Also, since the amount of light instantaneously emitted by the specific region of the stimulable phosphor sheet is detected for approximately grasping the stored radiation image information, it becomes possible to eliminate the problem that, even when an image of the same portion of an object is recorded under the same radiation exposure conditions, the grasped image information becomes different if the area of the stimulable phosphor sheet actually exposed to the radiation is different. Thus, it is possible to consistently grasp the image information. Therefore, it becomes possible to easily adjust the read-out conditions and/or image processing conditions to optimal values on the basis of the grasped image information. As a result, it becomes possible to consistently obtain a reproduced visible image having an improved image quality, particularly a high diagnostic efficiency and accuracy.

In the radiation image recording and read-out apparatus of the present invention, since the stimulable phosphor sheets are circulated through the image recording section, the image read-out section and the erasing section, it is possible to reuse the stimulable phosphor sheets and to realize an apparatus which is small in size. Further, the apparatus of the present invention can conduct continuous image recording and thus is suitable for mass medical examinations. The technical effects of the present invention are very advantageous in practical use.

DESCRIPTION OF THE PREFERRED EMBODIMENTS

The present invention will hereinbelow be described in further detail with reference to the accompanying drawings.

Figure 1:
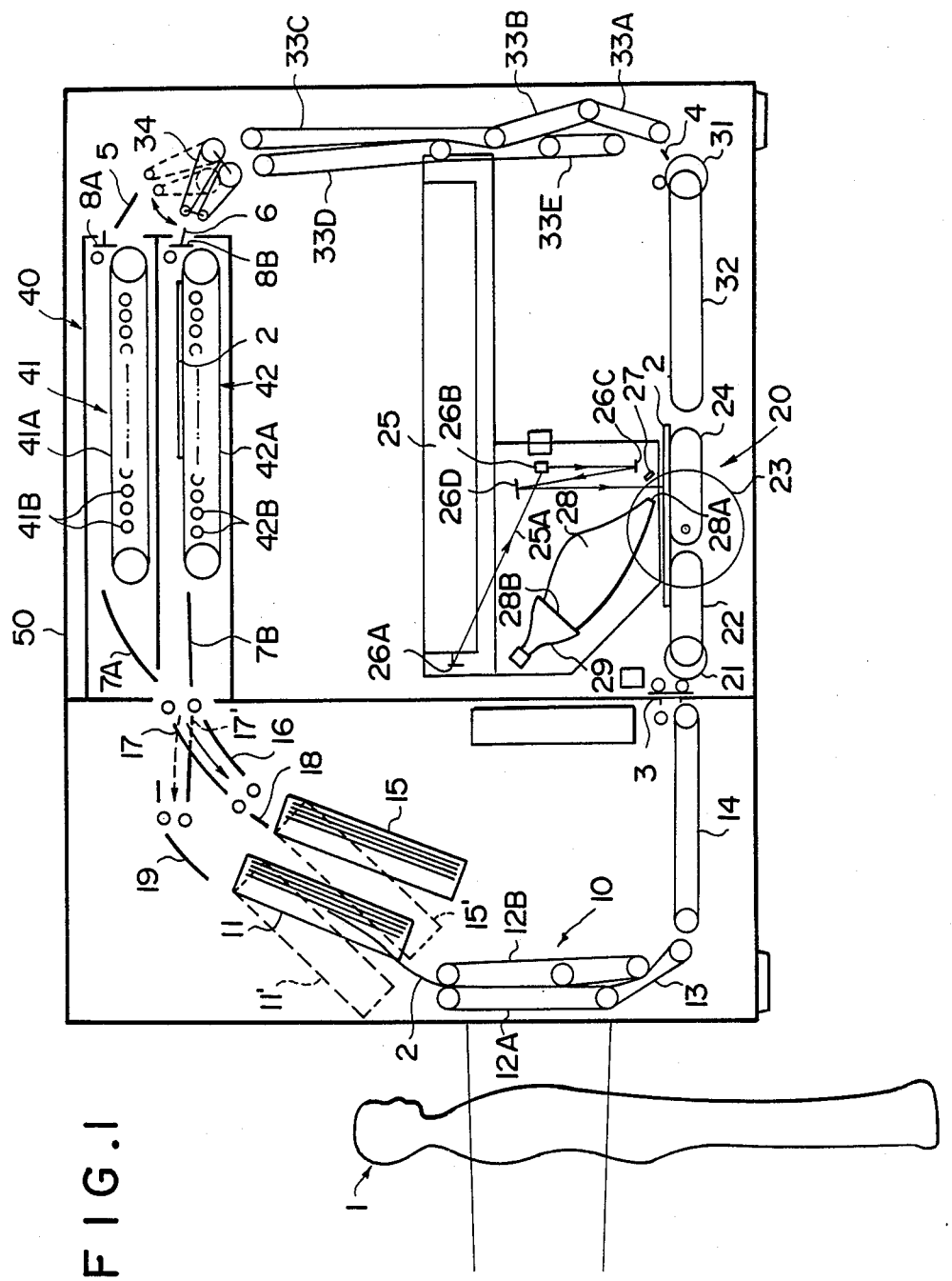
FIG. 1 is a schematic view showing an embodiment of the section of the radiation image recording and read-out apparatus in accordance with the present invention outside of the light amount detecting means and the condition adjusting means.

FIG. 1 schematically shows an embodiment of the section of the radiation image recording and read-out apparatus in accordance with the present invention outside of the light amount detecting means and the condition adjusting means.

An image recording section 10 is positioned at the same height as that of the frontal chest of an object 1. To the image recording section 10 are fed stimulable phosphor sheets 2 one by one from a sheet case 11 or 15 in the sheet feed position. The image recording section 10 comprises a pair of endless belts 12A and 12B for holding the sheet 2 therebetween, and an auxiliary endless belt 13 positioned under the endless belts 12A and 12B for receiving the sheet 2 from the endless belts 12A and 12B and guiding it to a conveyor belt 14. The conveyor belt 14 receives the sheet 2 from the image recording section 10 and conveys it to an image read-out section 20.

In the image read-out section 20, a first feed belt 22 driven by a motor 21 and a second feed belt 24 driven by a motor 23 are positioned in series to feed the sheet 2 at a predetermined speed in the sub-scanning direction. Between the image recording section 10 and the image read-out section 20 is positioned an openable shutter 3 for preventing any disturbing light from entering the image read-out section 20 from the image recording section 10 when the radiation image stored in the sheet 2 is read out in the image read-out section 20. In the image read-out section 20, a laser beam source 25 is positioned above the first feed belt 22 and the second feed belt 24. There are also positioned a mirror 26A, a galvanometer mirror 26B, a mirror 26C and a mirror 26D for scanning the sheet 2 on the belts 22 and 24 with a laser beam 25A emitted by the laser beam source 25. As the galvanometer mirror 26B is swung, the sheet 2 is scanned with the laser beam 25A in the main scanning direction. At the scanning position of the laser beam 25A on the sheet 2 is positioned a light guiding reflection mirror 27 along the main scanning line. Thus light emitted by the sheet 2 upon stimulation thereof by the laser beam 25A, including the light emitted thereby and reflected by the light guiding reflection mirror 27, enters a light guiding optical element 28 from a light input face 28A thereof. The light is guided inside of the light guiding optical element 28 through total reflection up to a light output face 28B of the light guiding optical element 28, and received by a photomultiplier 29 in close contact with the light output face 28B. In this manner, the light emitted by the sheet 2 in proportion to the radiation energy stored therein is detected and converted into an electric image signal by the photomultiplier 29. The electric image signal thus obtained is sent to an image processing circuit (not shown) and subjected therein to necessary image processing. The electric image signal thus processed is then sent to an image reproducing apparatus (not shown). As described above, the image reproducing apparats may be a display device such as a CRT, or may be a photographic reproducing apparatus for reproducing a visible image in a photographic film by point-by-point scanning, or may be a memory device using e.g. a magnetic tape for memorizing the electric image signal for later use in image reproduction.

On the downstream side of the image read-out section 20 is positioned a feed belt 32 driven by a motor 31. Above the feed belt 32 on the downstream side thereof are vertically positioned endless belts 33A, 33B, 33C, 33D and 33E for holding and conveying the sheet 2. Further, above the group of endless belts 33A through 33E (i.e. on the downstream side thereof) is positioned a pair of belts 34 which are made pivotable so that the sheet conveying direction can be changed to distribute the sheets 2 in two directions. Between the downstream end portion of the feed belt 32 and the lower end portion of the group of belts 33A through 33E is positioned a guide plate 4 for guiding the sheet 2 from the former to the latter.

In front of the pair of belts 34 (i.e. on the downstream side thereof) is positioned an erasing section 40 comprising a pair of erasing units 41 and 42 installed one above the other. A guide plate 5 is positioned between the inlet of the erasing unit 41 and the pair of belts 34, and a guide plate 6 is positioned between the inlet of the erasing unit 42 and the pair of belts 34. The erasing unit 41 comprises a transparent endless belt 41A and a plurality of fluorescent lamps 41B positioned inside of the endless belt 41A, and the erasing unit 42 comprises a transparent endless belt 42A and a plurality of fluorescent lamps 42B positioned inside of the endless belt 42A. In the erasing section 40, since a long time is required for erasing, the sheet feed speed must, in an apparatus having a small size, be lower than that on the upstream side of the erasing section 40 in order that erasing can be carried out over a long time. Therefore, in the erasing section 40, the endless belts 41A and 42A are used alternately and the feed speeds thereof are adjusted to values far lower than the sheet feed speed on the upstream side of the erasing section 40, so that a long erasing time can be obtained with short endless belts. At the outlet of the erasing units 41 and 42 are positioned a guide plate 16 and a distribution plate 17 for distributing the sheets 2 conveyed out of the erasing units 41 and 42 via guide plates 7A and 7B to the sheet cases 11 and 15. Thus, the sheets 2 conveyed out of the erasing units 41 and 42 are alternately forwarded to the sheet cases 11 and 15.

In FIG. 1, the distribution plate 17 is in the position for guiding the sheets 2 into the lower sheet case 15, the lower sheet case 15 is in the position for receiving the sheets 2, and the upper sheet case 11 is in the position feeding the sheets 2 to the image recording section 10. The sheet cases 11 and 15 alternately repeat sheet receiving and sheet feeding. More specifically, when all of the sheets 2 housed in the upper sheet case 11 have been fed one by one to the image recording section 10, the sheet case 11 is moved up to the sheet receiving position indicated by a chain line 11'. Thereafter, the sheet case 15 containing the sheets 2 in the sheet receiving position is moved up to the sheet feed position indicated by a chain line 15', and the sheets 2 are fed one by one from the sheet case 15 to the image recording section 10. Thus the sheet cases 11 and 15 are installed for movement between the sheet receiving position and the sheet feed position. When the sheets 2 are fed from either one of the sheet cases 11 and 15, the other is in the position receiving the sheets 2. Thus, when one of the sheet cases 11 and 15 is used for sheet feeding and runs out of the sheets 2, then the positions of the sheet cases 11 and 15 are changed and the sheets 2 are fed from the other sheet case in which the sheets 2 have been accumulated.

Between the inlet portions of the erasing units 41 and 42 and the pair of belts 34 are positioned shutters 8A and 8B for preventing the erasing light from leaking out of the erasing units 41 and 42.

In the embodiment described above, the sheet 2 in which a radiation image is stored in the image recording section 10 is passed through the image read-out section 20, belts 33A through 33E, and the erasing section 40, and then returned to and temporarily housed in the sheet case 11 or 15. When a predetermined number of sheets 2 have been accumulated in the sheet case 11 or 15, the sheet case 11 or 15 is moved to the sheet feed position, and the sheets 2 are again fed one by one to the image recording section 10 and reused for image recording.

In the above-described embodiment, the sheet cases 11 and 15 are positioned between the image recording section 10 and the erasing section 40. However, the sheet cases 11 and 15 may be installed in any other position, for example, in front of or at the rear of the image read-out section 20.

In the aforesaid embodiment, when the stimulable phosphor sheet 2 is introduced into the erasing section 40, image read-out should not be conducted so that no noise is generated by intensive light of the fluorescent lamps 41B and 42B of the erasing units 41 and 42. Also, at this time, the power source for the photomultiplier 29 in the image read-out section 20 should preferably be turned off so that no overcurrent will flow through the photomultiplier 29.

Embodiments of the light amount detecting means and the condition adjusting means will now be described below.

Figure 2:
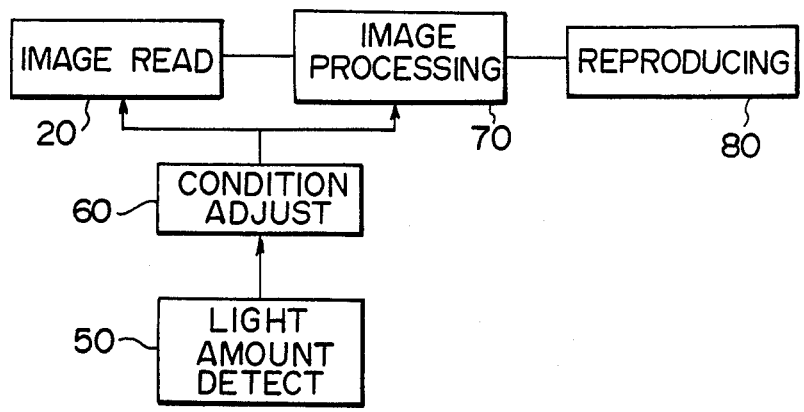
FIG. 2 is a block diagram showing the relationship among the light amount detecting means, the condition adjusting means, and the apparatus section shown in FIG. 1, FIGS. 3 and 4 are schematic views showing embodiments of the specific region.

FIG. 2 shows the relationship among the light amount detecting means, the condition adjusting means, and the section of the radiation image recording and read-out apparatus shown in FIG. 1. A signal representing the instantaneous light emission amount detected by a light amount detecting means 50 is sent to a condition adjusting means 60 which calculates the read-out conditions and/or image processing conditions on the basis of the signal of the instantaneous light emission amount and various other specified signals. The signals representing the read-out conditions and image processing conditions thus obtained are respectively sent to the image read-out section 20 and an image processing circuit 70 (not shown in FIG. 1). At the image read-out step for detecting the light emitted by the stimulable phosphor sheet 2 in proportion to the radiation energy stored and converting the emitted light into an image signal, the image read-out section 20 conducts image read-out on the basis of the calculated read-out conditions. The image signal thus obtained is processed by the image processing circuit 70 on the basis of the calculated image processing conditions. The processed image signal is then used to reproduce a visible image by an image reproducing apparatus 80 (not shown in FIG. 1).

Figure 3:
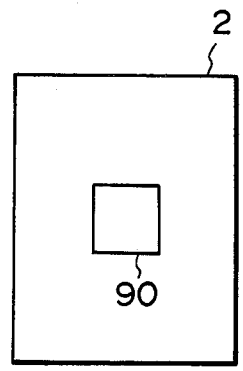
Figure 4:
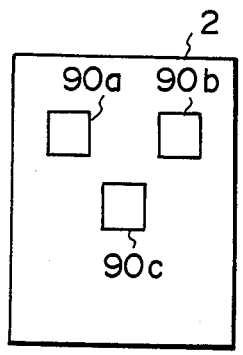

The light amount detecting means 50 is used to detect the amount of light instantaneously emitted by the specific region of the stimulable phosphor sheet 2. FIG. 3 shows an embodiment of the specific region in the case of general image recording, and FIG. 4 shows an embodiment of the specific region in the case of chest image recording. In the case of general image recording, since the region which should be diagnosed is usually the center region of the stimulable phosphor sheet 2, the center region thereof is selected as a specific region 90. In the case of chest image recording, since the information on the lungs is important, the specific region is constituted by three specific sections 90a, 90b and 90c as shown in FIG. 4 so that the specific region corresponds to the lungs even in the front or lateral image recording. In front image recording, the images of the lungs are positioned at the specific sections 90a and 90b. In lateral image recording, the images of the lungs are positioned at the specific section 90c.

Figure 5:
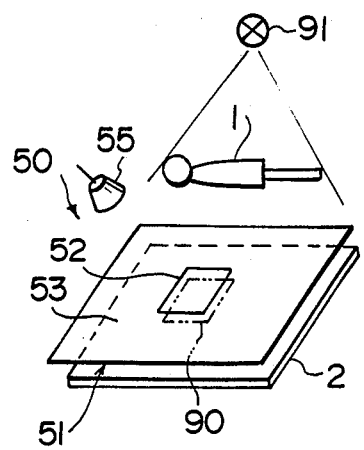
FIGS. 5 to 9 are schematic views showing embodiments of the light amount detecting means.
Figure 6:
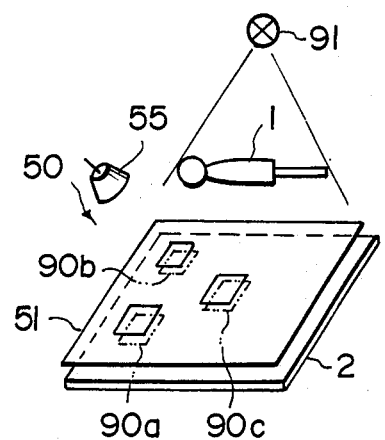
Figure 7:
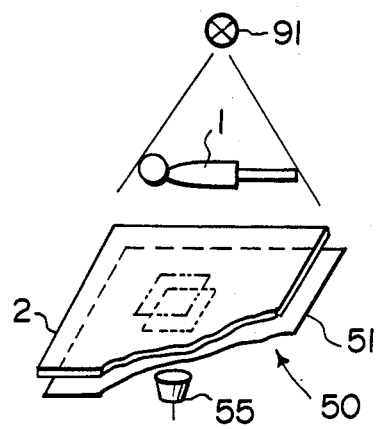

FIGS. 5, 6 and 7 are perspective views showing the condition of detecting the instantaneous light emission amount by use of the light amount detecting means 50. The light amount detecting means 50 shown comprises a filter 51 and a photodetector 55. In the filter 51, a portion 52 corresponding to the specific region 90 of the stimulable phosphor sheet 2 is fabricated of a material permeable to the radiation used for image recording and the instantaneously emitted light, and the other portion 53 is fabricated of a material exhibiting approximately the same radiation transmittance as that of the portion 52 and absorbing the instantaneously emitted light.

FIG. 5 shows the case of general image recording. The filter 51 is positioned between the stimulable phosphor sheet 2 and a radiation source 91, and the photodetector 55 is positioned between the filter 51 and the radiation source 91. The filter 51 is positioned near the stimulable phosphor sheet 2 so that it covers the whole surface thereof and the filter portion 52 corresponding to the specific region 90 of the stimulable phosphor sheet 2 aligns with the specific region 90. When the object 1 is exposed to the radiation emitted by the radiation source 91, the radiation passing through the object 1 passes the whole surface of the filter 51 and impinges upon the stimulable phosphor sheet 2 to have a radiation image of the object 1 stored in the stimulable phosphor sheet 2. At the same time, light is instantaneously emitted by the stimulable phosphor sheet 2. The light instantaneously emitted by the region of the stimulable phosphor sheet 2 outside of the specific region 90 thereof is absorbed by the filter portion 53 outside of the portion 52 corresponding to the specific region 90. Only the light instantaneously emitted by the specific region 90 passes through the filter portion 52, and is detected by the photodetector 55 positioned above the filter 90. Thus the amount of light instantaneously emitted by the specific region 90 is measured.

In the case of chest image recording, the instantaneous light emission amount may be measured as shown in FIG. 6.

FIG. 7 shows another embodiment for general image recording. When the substrate for the stimulable phosphor in the stimulable phosphor sheet 2 is permeable to the instantaneously emitted light, the filter 51 may be positioned on the side opposite to the radiation source 91 with respect to the stimulable phosphor sheet 2, and the photodetector 55 may be positioned below the filter 51. Of course, this embodiment may also be used for the chest image recording.

Figure 8:
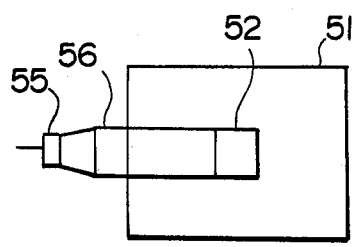
Figure 9:
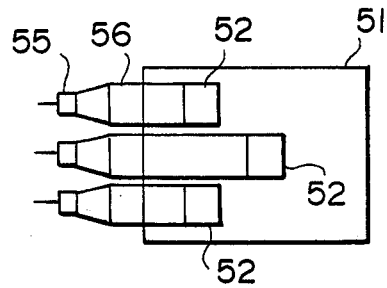

As shown in FIGS. 8 and 9, it is also possible to detect the instantaneous light emission amount by covering the filter portion or portions 52 corresponding to the specific region 90 or specific sections 90a, 90b and 90c by a light guide member or members 56, and connecting the photodetector or photodetectors 55 to the light guide member or members 56. The light guide member or members 56 should preferably be positioned on the side opposite to the stimulable phosphor sheet 2 with respect to the filter 51.

In the embodiment of FIG. 6, the sum of the amounts of light instantaneously emitted by the specific sections 90a, 90b and 90c is calculated. In the embodiment of FIG. 9, since the amounts of light instantaneously emitted by the specific sections 90a, 90b and 90c can be detected independently, it is possible to calculate the sum, the mean value or the maximum of the instantaneous light emission amounts.

The read-out conditions and/or image processing conditions are adjusted on the basis of the amount of light instantaneously emitted by the specific region 90. When the specific region 90 consists of a plurality of specific sections as in the case of chest image recording, it is possible to use the sum, the mean value or the maximum of the amounts of light instantaneously emitted by the specific sections as the instantaneous light emission amount for the adjustment of the read-out conditions and/or image processing conditions.

By way of example, the read-out conditions may be adjusted as described below on the basis of the amount of light instantaneously emitted by the specific region 90. Namely, on the basis of the proportional relationship between the instantaneous light emission amount and the radiation energy stored in the stimulable phosphor sheet, the amount of light (Sav) emitted by the specific region 90 in proportion to the radiation energy stored therein is calculated from the instantaneous light emission amount (Iav) at the specific region 90. The read-out gain is adjusted so that Sav corresponds to a desired input signal value Qav in the image processing means, i.e. so that the electric signal value Qav is obtained when Sav is detected by the photoelectric read-out means by use of the read-out gain. In this method, the read-out gain is adjusted by the function f(Iav, Qav, scale factor). When the specific region 90 consists of a plurality of specific sections, it is possible to use the sum, the mean value or the maximum of the amounts of light instantaneously emitted by the specific sections as Iav. The read-out scale factor as one of the read-out conditions may be adjusted to an appropriate value on the basis of the image recording portion of the object and the image recording method.

The image processing conditions may be adjusted as described below on the basis of the instantaneous light emission amount at the specific region 90. Namely, when the read-out gain and the read-out scale factor have been adjusted on the basis of the image recording portion of the object and the image recording method, a predetermined correction value Qc is added to the image signal so that the input signal value in the image processing means corresponding to the light amount Sav which is emitted by the specific region 90 in proportion to the radiation energy stored therein and which is calculated from the instantaneous light emission amount Iav at the specific region 90 becomes the desired input signal value Qav determined by the image recording portion of the object and the image recording method. The correction value Qc is calculated by Qc = f(Iav, Qav, scale factor, read-out gain).

The read-out conditions and image processing conditions may be adjusted on the basis of only the instantaneous light emission amount at the specific region 90, or may be adjusted by also considering the image recording portion of the object and the image recording method in addition to the instantaneous light emission amount at the specific region 90.

The radiation image recording and read-out apparatus in accordance with the present invention is fabricated by incorporating the light amount detecting means and the condition adjusting means as shown in FIGS. 2 to 9 into the apparatus section as shown in FIG. 1 in the manner as shown in FIG. 2.

Figure 10:
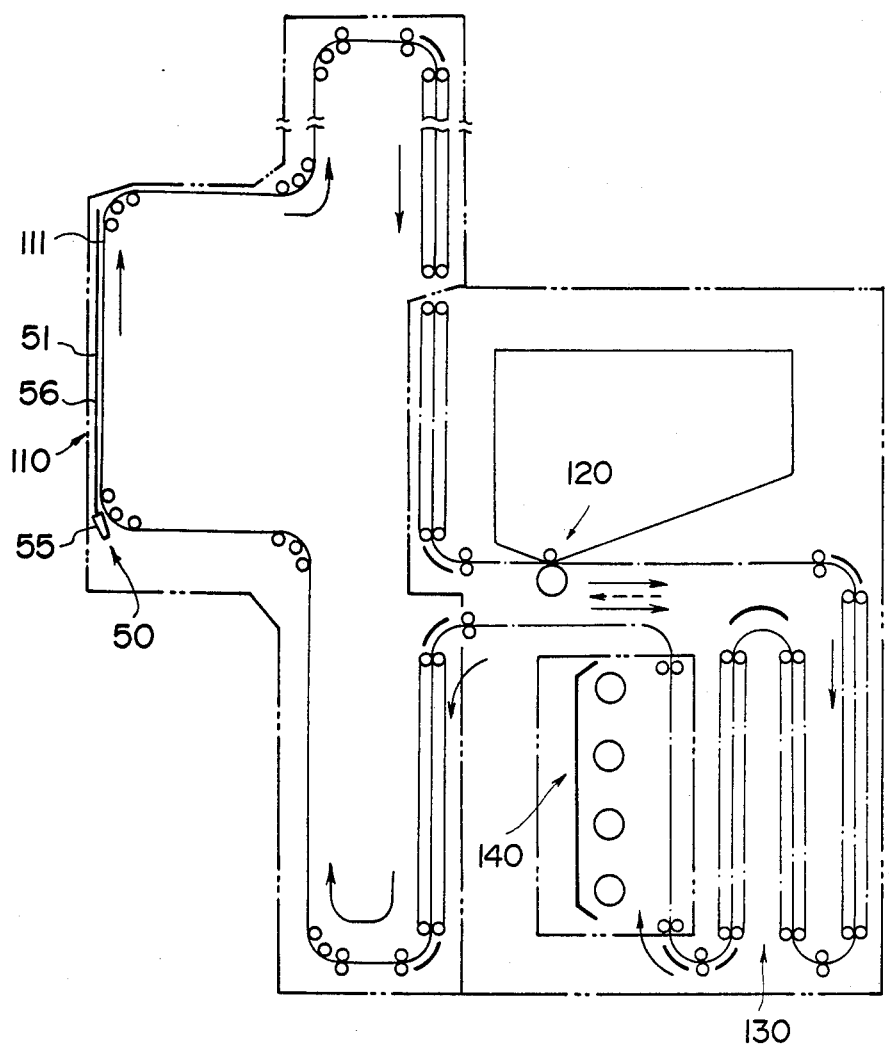
FIGS. 10 to 13 are schematic views showing further embodiments of the radiation image recording and read-out apparatus in accordance with the present invention.

FIG. 10 shows another embodiment of the radiation image recording and read-out apparatus in accordance with the present invention, which is of the chest type suitable for recording an image of the frontal chest of the human body. An image recording section 110 is provided with the light amount detecting means 50 comprising the filter 51, the light guide member or members 56 positioned above the filter 51, and the photodetector or photodetectors 55 connected to the light guide member or members 56 as shown in FIG. 8 or 9. In this embodiment, an object (not shown) is positioned on the left side of an image recording section 110, and a radiation source (not shown) is positioned on the left side of the object. When a stimulable phosphor sheet (not shown) positioned at the image recording section 110 is exposed to the radiation emitted by the radiation source and passing through the object, a radiation image of the object is stored in the stimulable phosphor sheet, and the amount of light instantaneously emitted by the stimulable phosphor sheet is detected by the light amount detecting means 50. The read-out conditions and/or image processing conditions are adjusted by the condition adjusting means 60 shown in FIG. 2 on the basis of the detected instantaneous light emission amount. The stimulable phosphor sheet carrying the radiation image stored therein is conveyed up by a conveyor belt 111 towards an image read-out section 120. In the image read-out section 120, the stimulable phosphor sheet is scanned by stimulating rays by use of the same components as those employed in the embodiment of FIG. 1, and light emitted by the stimulable phosphor sheet upon stimulation thereof is photoelectrically detected. As shown in FIG. 2, the obtained image signal is processed by use of the image processing conditions in the image processing circuit 70, and is used for reproducing a visible image by the image reproducing apparatus 80. After the image read-out step is over, the stimulable phosphor sheet is conveyed by a group of belts 130 to an erasing section 140, and then again conveyed to the image recording section 110 for reuse in image recording.

Figure 11:
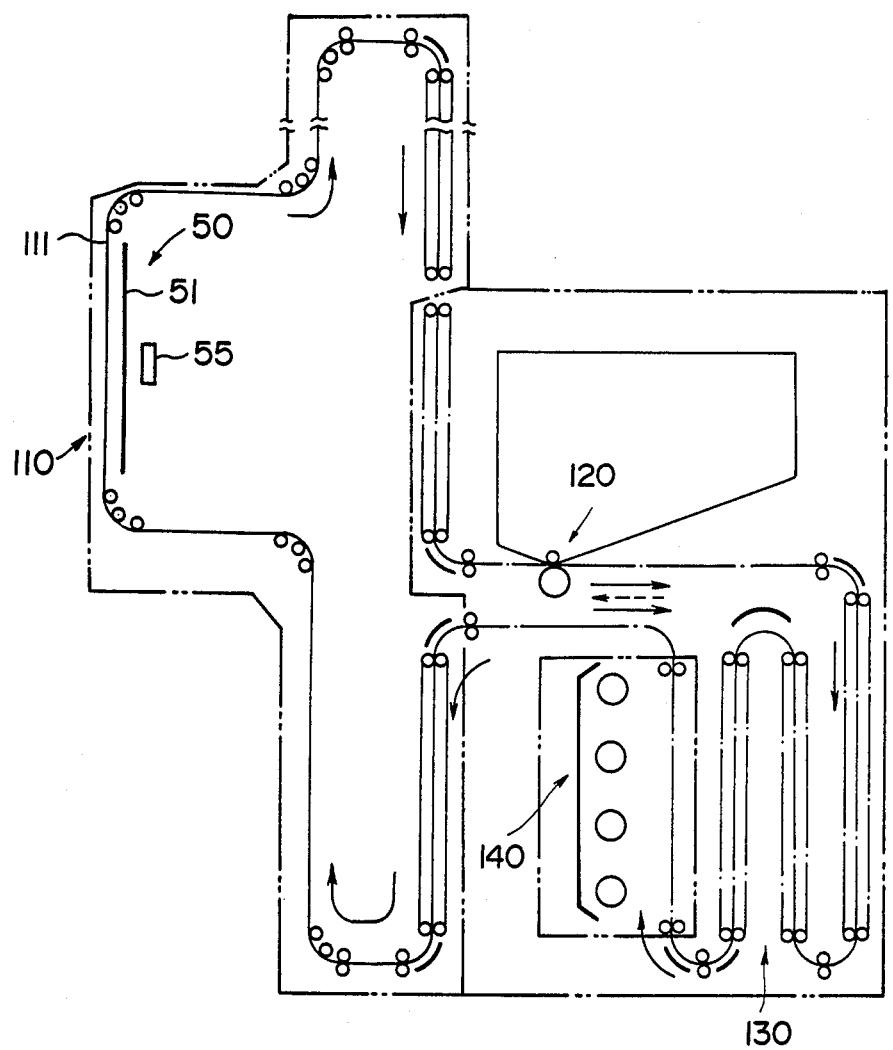

FIG. 11 shows a further embodiment of the radiation image recording and read-out apparatus in accordance with the present invention, which is similar to the embodiment of FIG. 10, except that the light amount detecting means 50 of the type shown in FIG. 7 is used.

Figure 12:
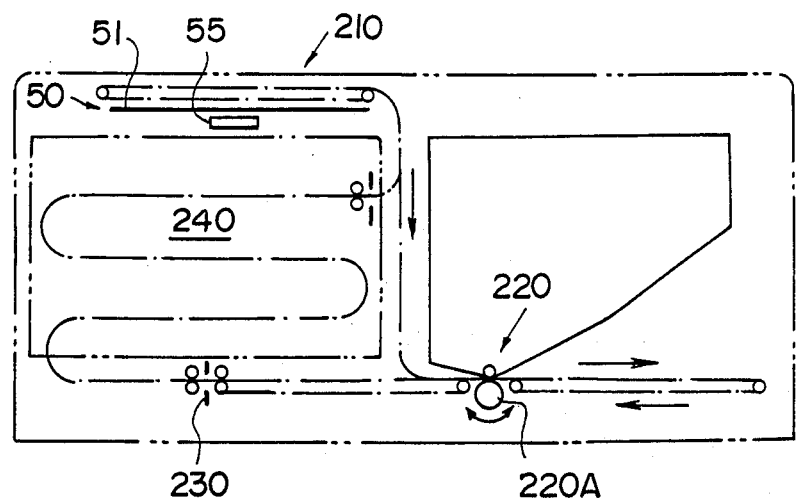

FIG. 12 shows a still further embodiment of the radiation image recording and read-out apparatus in accordance with the present invention, which is of the bed type for recording an image of an object in a lying position and in which the light amount detecting means 50 of the type shown in FIG. 7 is incorporated. The basic configuration of the apparatus is the same as those of FIGS. 10 and 11. An image recording section 210 is positioned horizontally, and a bed (not shown) on which the object lies is positioned on the image recording section 210. After the stimulable phosphor sheet is sent from the image recording section 210 to the image read-out section 220, the sheet is moved forward and backward by a roller 220A at the image read-out section 220. Image read-out is conducted when the stimulable phosphor sheet is moved forward or backward. The stimulable phosphor sheet is sent to an erasing section 240 via a shutter 230 and then to the image recording section 210.

Figure 13:
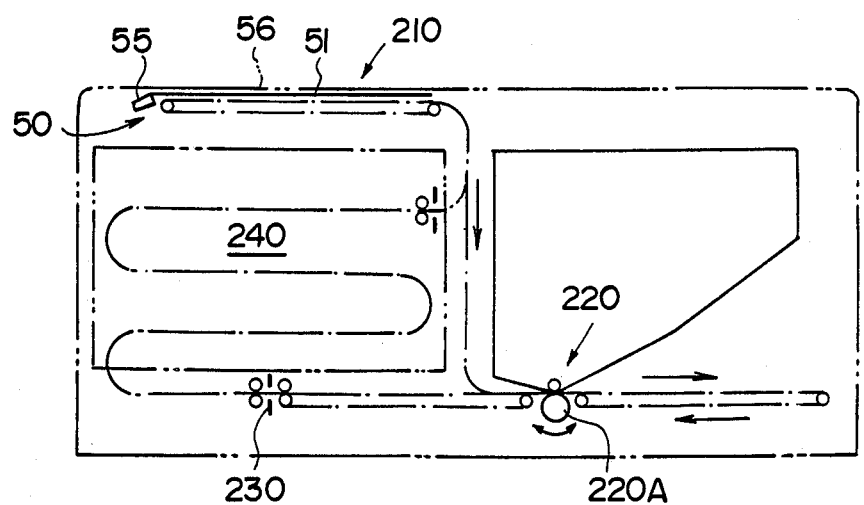

FIG. 13 shows another embodiment of the radiation image recording and read-out apparatus in accordance with the present invention, which is similar to the embodiment of FIG. 12, except that the light amount detecting means 50 using the light guide member or members 56 as shown in FIG. 8 or 9 is incorporated.

We claim:

1. In a radiation image recording and reproducing system for exposing a stimulable phosphor sheet to a radiation passing through an object to have a radiation image of the object stored in the stimulable phosphor sheet, scanning the stimulable phosphor sheet carrying the radiation image stored therein by stimulating rays which cause the stimulable phosphor sheet to emit light in proportion to the radiation energy stored, photoelectrically detecting the emitted light to obtain an image signal, subjecting the image signal to image processing, and reproducing a visible image by use of the processed image signal, a radiation image read-out method comprising the steps of:
  (i) detecting the amount of light instantaneously emitted by a specific region of said stimulable phosphor sheet when said stimulable phosphor sheet is exposed to the radiation passing through the object to have the radiation image of the object stored in said stimulable phosphor sheet, and
  (ii) on the basis of the detected amount of light instantaneously emitted by said specific region, adjusting read-out conditions used when the light emitted by said stimulable phosphor sheet upon exposure to the stimulating rays is photoelectrically detected and/or image processing conditions used when said image signal is subjected to the image processing.

2. A method as defined in claim 1 wherein the detection of the amount of light instantaneously emitted by said specific region of said stimulable phosphor sheet is carried out by use of a filter effecting that filter portion corresponding to said specific region transmits the radiation and the instantaneously emitted light, and the other portion transmits the radiation and absorbs the instantaneously emitted light.

3. A method as defined in claim 2 wherein said filter is positioned on the radiation source side of said stimulable phosphor sheet.

4. A method as defined in claim 2 wherein said filter is positioned on the side opposite to a radiation source with respect to said stimulable phosphor sheet.

5. A radiation image recording and read-out apparatus comprising:
  (i) a circulating and conveying means for conveying at least one stimulable phosphor sheet for recording a radiation image thereon along a predetermined circulation path,
  (ii) an image recording section positioned on said circulation path for recording a radiation image of an object in said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned with said stimulating rays to obtain an electric image signal, (iv) an erasing section for, prior to the next image recording in said stimulable phosphor sheet for which the image read-out has been conducted at said image read-out section, exposing said stimulable phosphor sheet to erasing light to release the radiation energy remaining in said stimulable phosphor sheet, (v) a light amount detecting means for detecting the amount of light instantaneously emitted by a specific region of said stimulable phosphor sheet when said stimulable phosphor sheet is exposed to the radiation passing through said object to have said radiation image of said object stored therein at said image recording section, and (vi) a condition adjusting means for adjusting readout conditions used for detecting the light emitted by said stimulable phosphor sheet to obtain the electric image signal at said image read-out section and/or image processing conditions used for image processing of the electric image signal obtained at said image read-out section on the basis of the instantaneous light emission amount detected by said light amount detecting means.

6. An apparatus as defined in claim 5 wherein said light amount detecting means comprises a filter positioned adjacent said stimulable phosphor sheet and effecting that filter portion corresponding to said specific region of said stimulable phosphor sheet transmits the radiation and the instantaneously emitted light and the other portion transmits the radiation and absorbs the instantaneously emitted light, and a photodetector for detecting the instantaneously emitted light passing through said filter portion corresponding to said specific region of said stimulable phosphor sheet.

7. An apparatus as defined in claim 6 wherein said filter is positioned on the radiation source side of said stimulable phosphor sheet.

8. An apparatus as defined in claim 6 wherein said filter is positioned on the side opposite to a radiation source with respect to said stimulable phosphor sheet.

9. An apparatus as defined in claim 6 wherein said filter portion corresponding to said specific region of said stimulable phosphor sheet is covered by a light guide member, and said light guide member is connected to said photodetector.

* * * * *